(12) United States Patent
Hung

(10) Patent No.: US 8,077,285 B2
(45) Date of Patent: Dec. 13, 2011

(54) LIQUID CRYSTAL DISPLAY INCLUDING NEIGHBORING SUB-PIXEL ELECTRODES WITH OPPOSITE POLARITIES IN THE SAME PIXEL

(75) Inventor: Meng-Yi Hung, Hsin-Chu (TW)

(73) Assignee: AU Optronics Corporation, Hsin-Chu (TW)

( * ) Notice: Subject to any disclaimer, the term of this patent is extended or adjusted under 35 U.S.C. 154(b) by 0 days.

(21) Appl. No.: 13/034,747

(22) Filed: Feb. 25, 2011

(65) Prior Publication Data

US 2011/0149225 A1    Jun. 23, 2011

Related U.S. Application Data

(62) Division of application No. 11/684,762, filed on Mar. 12, 2007, now Pat. No. 7,924,387.

(30) Foreign Application Priority Data

Mar. 17, 2006 (TW) ................................. 95109332 A

(51) Int. Cl.
    G02F 1/1343 (2006.01)
    G02F 1/1337 (2006.01)

(52) U.S. Cl. .................... 349/144; 349/129; 349/143

(58) Field of Classification Search .......... 349/143–144, 349/129
    See application file for complete search history.

(56) References Cited

U.S. PATENT DOCUMENTS

| | | | |
|---|---|---|---|
| 6,922,183 B2 | 7/2005 | Ting et al. | |
| 6,958,791 B2 | 10/2005 | Shimoshikiryo | |
| 2005/0041188 A1 | 2/2005 | Yamazaki | |
| 2005/0105032 A1 | 5/2005 | Ono et al. | |
| 2007/0058122 A1* | 3/2007 | Ong | 349/143 |
| 2008/0002109 A1* | 1/2008 | Ong | 349/98 |

FOREIGN PATENT DOCUMENTS

| | | |
|---|---|---|
| JP | 11119193 | 4/1999 |
| JP | 2005316211 | 11/2005 |
| KR | 1020020072723 | 9/2002 |
| TW | 200428345 | 12/2004 |
| WO | 2005040904 | 5/2005 |

OTHER PUBLICATIONS

English language translation of abstract of JP 11119193 (published Apr. 30, 199).
English language translation of abstract of KR 1020020072723 (published Sep. 18, 2002). English language translation of abstract of TW 200428345 (published Dec. 16, 2004).
English language translation of abstract of JP 2005316211 (published Nov. 10, 2005).
Chinese language Notice of Allowance dated Sep. 29, 2009 and its English language translation.

* cited by examiner

*Primary Examiner* — Nathanael R Briggs
(74) *Attorney, Agent, or Firm* — Thomas, Kayden, Horstemeyer & Risley, LLP

(57) ABSTRACT

A liquid crystal display includes an upper substrate, a lower substrate and a liquid crystal layer interposed between the upper substrate and the lower substrate. The lower substrate includes a pixel array divided into a plurality of columns of pixel areas and a plurality of rows of pixel areas. Each pixel area includes a upper sub-pixel electrode, a lower sub-pixel electrode insulated to the upper sub-pixel electrode and a TFT switch electrically connected to the lower sub-pixel electrode. The upper sub-pixel electrode is electrically connected to a lower sub-pixel electrode of a previous column, and the lower sub-pixel electrode is electrically connected to a upper sub-pixel electrode of a next column.

9 Claims, 2 Drawing Sheets

LIQUID CRYSTAL DISPLAY INCLUDING NEIGHBORING SUB-PIXEL ELECTRODES WITH OPPOSITE POLARITIES IN THE SAME PIXEL

RELATED APPLICATIONS

The present application is a division of U.S. application Ser. No. 11/684,762 filed Mar. 12, 2007, now U.S. Pat. No. 7,924,387, which claims priority to Taiwan Patent Application Serial Number 95109332, filed Mar. 17, 2006. All of these applications are incorporated herein by reference.

BACKGROUND

1. Field of Invention

The present invention relates to a liquid crystal display. More particularly, the present invention relates to a liquid crystal display containing sub-pixel electrodes.

2. Description of Related Art

Very wide viewing angles and high definition, among others, are the advantages of a multi-domain vertical alignment (MVA) liquid crystal display (LCD). Some slits and protrusions are formed on the inner surfaces of two transparent substrates in a conventional MVA LCD in which vertically aligned liquid crystal molecules are tilted symmetrically in opposite directions to compensate for viewing angles.

As disclosed in U.S. Pat. No. 6,922,183 (hereinafter, the "'183 patent"), the lateral electric field applied to the slits on the inner surface of the transparent electrode of an MVA LCD has to be increased, so the liquid crystal molecules in the proximity of the slit can be inclined efficiently and liquid crystal molecular response time can be reduced. A pixel electrode is divided into two sub-pixel electrodes, and thus a pixel is divided into two sub-pixels. The two equipotential sub-pixel electrodes with opposite polarities are electrically isolated to each other by the slit. Lateral electric field is created on the slits to reduce response time of liquid crystal molecules.

However, the invention disclosed by the '183 patent requires each of two sub-pixel electrodes to be connected with a switch as a driving device for the corresponding sub-pixel. The number of driving devices for each pixel is thus doubled. In addition, sub-pixels with opposite polarities must have their own contact holes to conduct their own electronic signals. When a pixel electrode is divided into several sub-pixel electrodes, sub-pixel electrodes with the same polarity have to be connected by additional wire in order to use one single switch as the driving device. The additional wire will increase both the complexity of electric circuit and the difficulty of manufacturing process.

SUMMARY

An LCD is provided. The pixel electrode array of the LCD comprises plural first pixel electrode and plural pixel electrode having opposite polarities.

Each of the first pixel electrode comprises a first connecting part and two first sub-pixel electrodes located in two adjacent pixel areas. Each first sub-pixel electrode has at least three corners. The two first sub-pixel electrodes are diagonally connected through the first connecting part at respective corners of the two first sub-pixel electrodes and separately located on one of the first pixel area and one of the second pixel area located adjacently.

Similarly, each of the second pixel electrode comprises a second connecting part and two second sub-pixel electrodes located in two adjacent pixel areas. Each second sub-pixel electrode has at least three corners. The two second sub-pixel electrodes are diagonally connected through the second connecting part at respective corners of the two second sub-pixel electrodes and separately located on one of the first pixel area and one of the second pixel area located adjacently in such a manner that one of the two first sub-pixel electrodes and one of the two second sub-pixel electrodes are disposed side by side. Hence, each pixel area comprises at least a first sub-pixel electrode and a second sub-pixel electrode.

Plural first switches are located on the first pixel areas to control the first pixel electrodes, respectively. Plural second switches are located on the second pixel areas to control the second pixel electrodes, respectively.

Accordingly, pixel electrode is divided into several structurally connected sub-pixel electrodes and only one driving switch device is required for one pixel electrode. Furthermore, the first sub-pixel electrode and the second sub-pixel electrode are alternatively arranged. Same electric potential with opposite polarities can be applied to neighboring first pixel electrode and second pixel electrode. At least one first sub-pixel electrode and one second sub-pixel electrode can be formed in each pixel area without additional signal line and driving switch device.

It is to be understood that both the foregoing general description and the following detailed description are by examples, and are intended to provide further explanation of the invention as claimed.

BRIEF DESCRIPTION OF THE DRAWINGS

The present invention can be more fully understood by reading the following detailed description of the embodiment, with reference made to the accompanying drawings as follows.

DETAILED DESCRIPTION

Accordingly, this invention provides an LCD, each pixel electrode of the LCD is divided into several sub-pixel electrodes. The two neighboring sub-pixel electrodes in the same pixel have opposite polarities. The number of switch devices does not need to be increased. Only conventional signal line and switch device are required to obtain two neighboring sub-pixel electrodes with opposite polarities in the same pixel. The LCD response time can thus be reduced.

Embodiment 1

Figure 1:
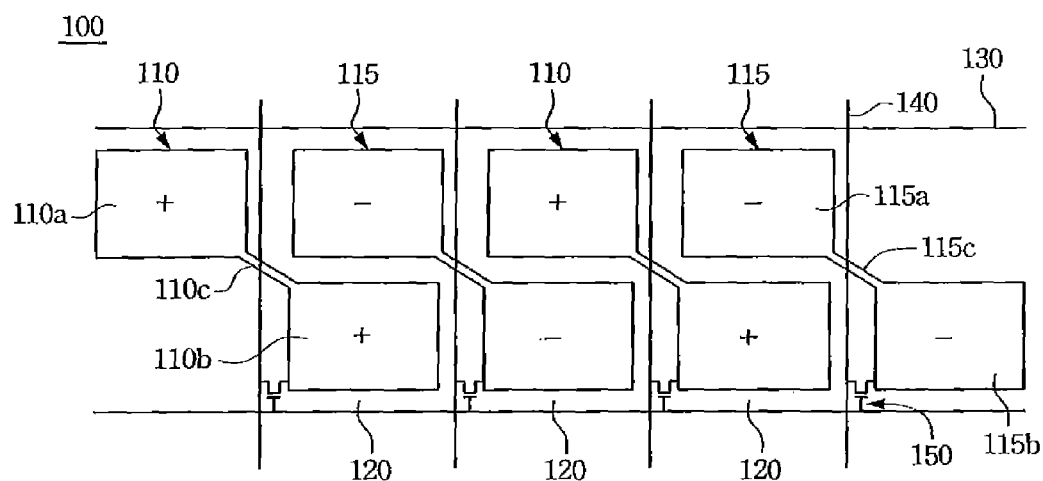
FIG. 1 illustrates the pixel array of an LCD according to an embodiment of the present invention.

FIG. 1 illustrates the pixel array of an LCD according to an embodiment of the invention. The pixel array 100 comprises pixel electrodes 110 and 115. The pixel electrode 110 comprises two sub-pixel electrodes 110*a* and 110*b*. The sub-pixel electrodes 110*a*, 110*b* are formed in two neighboring pixel areas 120 sharing an edge and diagonally connected to each other through a connecting part 110*c*. Similarly, pixel electrode 115 comprises two sub-pixel electrodes 115*a* and 115*b*. The sub-pixel electrodes 115*a* and 115*b* are formed in two neighboring pixel areas 120 sharing an edge and diagonally connected to each other through a connecting part 115c. Therefore, a repeating unit of the pattern formed by the first sub-pixel electrodes 110a, 110b and the second sub-pixel electrodes 115a, 115b is two first sub-pixel electrodes 110a, 110b in the two diagonal areas of a parallelogram and two second sub-pixel electrodes 115a, 115b in the other two diagonal areas of the parallelogram.

Each of the above mentioned pixel area 120 is defined by a pair of scan lines 130 and a pair of data lines 140. A switch device 150 is formed in one corner of the pixel area 120. The switch device 150 of this embodiment is a thin film transistor with a gate, a source and a drain connected to the scan line 130, the data line 140, the sub-pixel electrode 110b or 115b, respectively.

The pixel electrodes 110, 115 shown in FIG. 1 are formed on a switch device substrate alternatively. The two neighboring pixel electrodes 110, 115 can be controlled to have opposite polarities, so that one pixel area 120 comprising two sub-pixel electrodes 110b, 115a (or 110a, 115b) with opposite polarities can be obtained. The sub-pixel electrodes 110b, 115a (or 110a, 115b) in one pixel area 120 belong to two different pixel electrodes 115, 110. Because, for example, the two sub-pixel electrodes (110a, 110b) or (115a, 115b) of one pixel electrode 110 or 115 are still connected to each other, only one switch device is required to drive the pixel electrodes 110, 115. In addition, dot inversion method or any appropriate method can be used to allow the two neighboring pixel electrodes 110, 115 to have opposite polarities.

Embodiment 2

Figure 2:
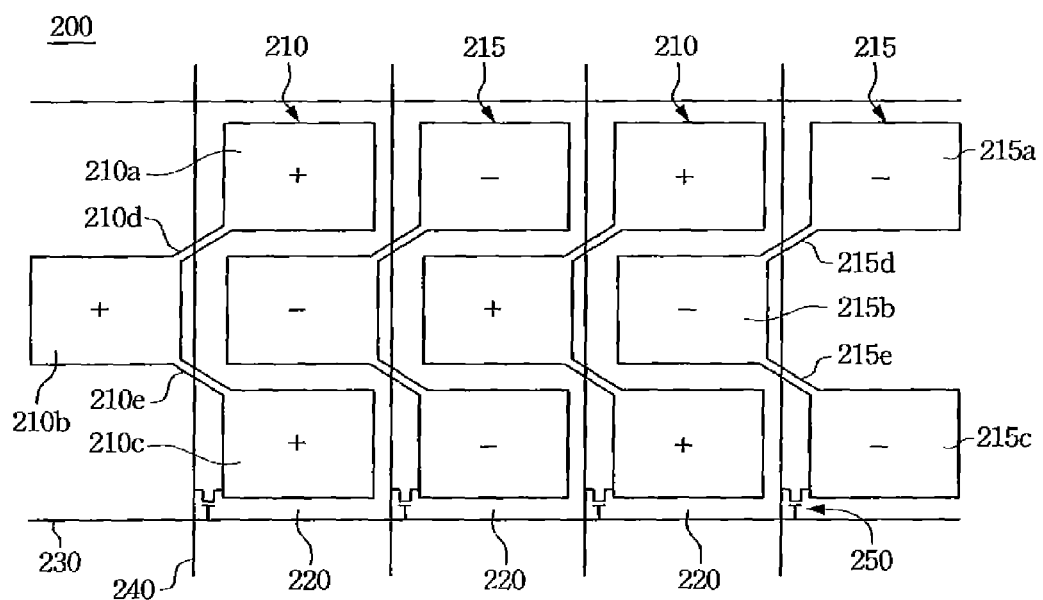
FIG. 2 illustrates the pixel array of an LCD according to another embodiment of the present invention.

FIG. 2 illustrates the pixel array of an LCD according to another embodiment of the invention. FIG. 2 shows that pixel array 200 is composed of pixel electrodes 210 and 215. The pixel electrode 210 is divided into three sub-pixel electrodes 210a, 210b, and 210c. The sub-pixel electrodes 210a, 210b, and 210c are formed in the two neighboring pixel areas 220 sharing an edge. The sub-pixel electrode 210b is diagonally connected to the sub-pixel electrodes 210a and 210c through connecting parts 210d and 210e. Similarly, the pixel electrode 215 is divided into three sub-pixel electrodes 215a, 215b, and 215c. The sub-pixel electrodes 215a, 215b, and 215c are formed in the two neighboring pixel areas 22 sharing an edge. The sub-pixel electrode 215b is diagonally connected to sub-pixel electrodes 215a and 215c through connecting parts 215d and 215e. Therefore, a repeating unit of the pattern formed by, for example, the first sub-pixel electrodes 210a, 110b and the second sub-pixel electrodes 215a, 215b is two first sub-pixel electrodes 210a, 210b in the two diagonal areas of a parallelogram and two second sub-pixel electrodes 215a, 215b in the other two diagonal areas of the parallelogram.

Each of the above mentioned pixel area 220 is defined by a pair of scan lines 230 and a pair of data lines 240. In addition, a switch device 250 is formed in one corner of each pixel area 220. The switch device 250 in this embodiment is a thin film transistor with a gate, a source and a drain connected to the scan line 230, the data line 240 and the sub-pixel electrode 210c or 215c, respectively.

As shown in FIG. 2, the pixel electrodes 210 and 215 are alternatively formed on a switch device substrate. The three sub-pixel electrodes 210a, 215b, 210c (or 215a, 210b, 215c) within the same pixel area 220 have opposite polarities between the sub-pixel electrodes 210a, 210c (or 215a, 215c) and the sub-pixel electrode 215b (or 210b) when the neighboring pixel electrode 210 and the pixel electrode 215 have opposite polarities. Although the sub-pixel electrodes 210a, 210b 210c of the pixel electrode 210 are arranged in two pixel areas 220 sharing an edge, the sub-pixel electrodes 210a, 210b, 210c of the pixel electrode 210 are connected through the connecting parts 210d and 210e. Hence, only one switch device 250 is required for the pixel electrode 210. Similarly, the sub-pixel electrodes 215a, 215b, 215c of the pixel electrode 215 are also connected through the connecting parts 215d and 215e; hence only one switch device 250 is required for the pixel electrode 215. The way to obtain two neighboring pixel electrodes 210, 215 with opposite polarities can be, for example, dot inversion.

Embodiment 3

Figure 3:
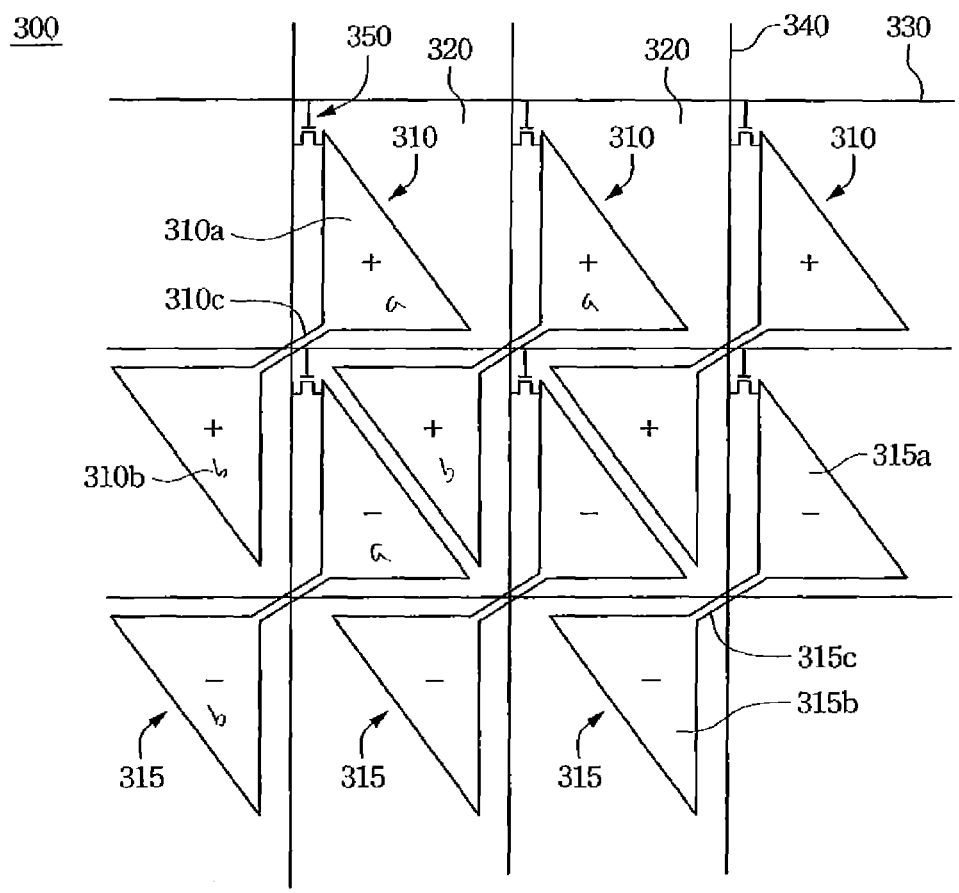
FIG. 3 illustrates the pixel array of an LCD according to another embodiment of the present invention.

FIG. 3 illustrates the pixel array of an LCD according to another embodiment of the invention. The pixel array 300 is composed of pixel electrodes 310 and 315. The pixel electrode 310 is divided into two sub-pixel electrodes 310a and 310b located in two pixel areas 320 sharing a corner. The sub-pixel electrodes 310a and 310b are connected to each other through a connecting part 310c. Similarly, pixel electrode 315 comprises two sub-pixel electrodes 315a, 315b located in two pixel areas 320 sharing a corner. The sub-pixel electrodes 315a and 315b are connected to each other through a connecting part 315c. Therefore, a repeating unit of a pattern formed by the first sub-pixel electrodes 310a, 310b and the second sub-pixel electrodes 315a, 315b is two first sub-pixel electrodes 310a, 310b located in the two opposite edges of a parallelogram and two second sub-pixel electrodes 315a, 315b located in the other two opposite edges of the parallelogram.

The above mentioned pixel area 320 is defined by a pair of scan line 330 and a pair of data line 340. A switch device 350 is formed in one corner of the pixel area 320. The switch device 350 in this embodiment is a thin film transistor with a gate, a source and a drain connected to the scan line 330, the data line 340, the sub-pixel electrode 310a or 315a, respectively.

The pixel electrodes 310, 315 shown in FIG. 3 are formed on a switch device substrate alternatively. The two neighboring pixel electrodes 310, 315 can be controlled to have opposite polarities, so that the same pixel area 320 comprising two sub-pixel electrodes 310b, 315a (or 315b, 310a) with opposite polarities can be obtained. Although the two sub-pixel electrodes 310b, 315a (or 315b, 310a) in one pixel area 320 belong to two different pixel electrodes 315 and 310, the two sub-pixel electrodes 310a, 310b (or 315a, 315b) belonged the pixel electrode 310 (or 315) are still connected to each other through the connecting part 310c. Hence, only one switch device is required to drive the pixel electrode 310 (or 315). In addition, dot inversion method or any appropriate method can be used to allow the two neighboring pixel electrodes 310, 315 to have opposite polarities.

Figure 4:
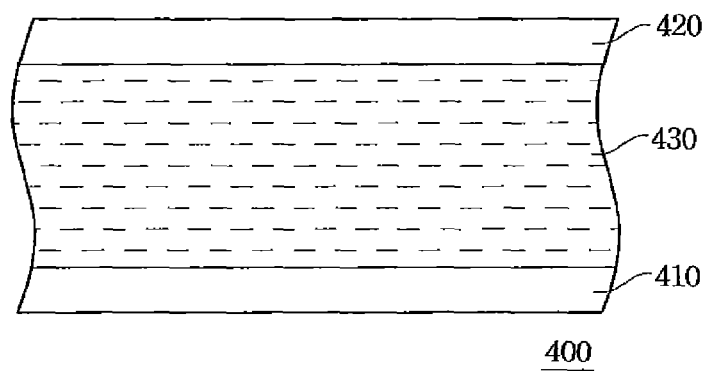
FIG. 4 illustrate a cross sectional view of a conventional LCD.

The above mentioned pixel array structure can be applied to any flat panel display, for example, LCD. Referring to FIG. 4, an LCD 400 comprises a lower substrate 410, an upper substrate 420 and a liquid crystal layer 430 disposed therebetween. There are many possible modifications for the lower substrate 410 and the upper substrate 420 of recent LCD 400 products. For the first example, the upper substrate 420 can be a color filter if the lower substrate 410 is a control circuit board. For the second example, the control circuit board and the color filter layer can be formed on the lower substrate 410, and there is only a common electrode layer on the upper substrate 420. Based on the location of the control circuit and the color filter, the structure can be either COA (Color Filter on Array) or AOC (Array on Color Filter). The detailed structures of COA and AOC are not shown in FIG. 4 because these possible modifications are apparent to those skilled in the art.

Accordingly, the pixel electrode is only divided into several structurally connected sub-pixel electrodes. Only one driving switch device is required for one pixel. Furthermore, pixel electrodes with opposite polarities are alternatively arranged. At least two sub-pixel electrodes can be formed on each pixel area without additional signal line and driving switch device.

It will be apparent to those skilled in the art that various modifications and variations can be made to the structures of the present invention without departing from the scope or spirit thereof. In view of the foregoing, it is intended that the present invention cover modifications and variations thereof provided they fall within the scope of the following claims.

What is claimed is:

1. A liquid crystal display, comprising:
    an upper substrate;
    a lower substrate comprising a pixel array divided into a plurality of columns of pixel areas and a plurality of rows of pixel areas, each pixel area being defined by a pair of scan lines and a pair of data lines, each pixel area comprising:
        a upper sub-pixel electrode;
        a lower sub-pixel electrode insulated to the upper sub-pixel electrode, the upper sub-pixel electrode and the lower sub-pixel electrode being disposed in a same one of the pixel areas; and
        a TFT switch electrically connected to the lower sub-pixel electrode;
        wherein the upper sub-pixel electrode is electrically connected to a lower sub-pixel electrode of a previous column, and the lower sub-pixel electrode is electrically connected to a upper sub-pixel electrode of a next column; and
    a liquid crystal layer interposed between the upper substrate and the lower substrate.

2. The liquid crystal display as claimed in claim 1, further comprising:
    a plurality of connecting parts, wherein the upper sub-pixel electrode is electrically connected through one of the connecting parts to the lower sub-pixel electrode of the previous column, and the lower sub-pixel electrode is electrically connected through the other one of the connecting parts to the upper sub-pixel electrode of the next column.

3. The liquid crystal display as claimed in claim 2, wherein the upper sub-pixel electrode has at least three corners and the lower sub-pixel electrode has at least three corners, and the upper sub-pixel electrode is diagonally connected through one of the connecting parts to the lower sub-pixel electrode at respective corners thereof.

4. The liquid crystal display as claimed in claim 1, wherein the upper sub-pixel electrode and the lower sub-pixel electrode in each of the columns of the pixel areas have opposite polarities.

5. The liquid crystal display as claimed in claim 1, wherein one upper sub-pixel electrode and one lower sub-pixel electrode in two diagonal areas of a parallelogram and one upper sub-pixel electrode and one lower sub-pixel electrode in the other two diagonal areas of the parallelogram form a repeating unit of pattern.

6. The liquid crystal display as claimed in claim 1, wherein one upper sub-pixel electrode and one lower sub-pixel electrode in two opposite edges of a parallelogram and one upper sub-pixel electrode and one lower sub-pixel electrode in the other two opposite edges of the parallelogram form a repeating unit of pattern.

7. The liquid crystal display as claimed in claim 1, wherein two adjacent columns of the pixel areas share a corner.

8. The liquid crystal display as claimed in claim 1, wherein two adjacent columns of the pixel areas share an edge.

9. The liquid crystal display as claimed in claim 1, wherein the upper sub-pixel electrode has at least three corners and the lower sub-pixel electrode has at least three corners, and the upper sub-pixel electrode is diagonally connected to the lower sub-pixel electrode at respective corners thereof.

* * * * *